United States Patent [19]

Kedl et al.

[11] Patent Number: 5,522,785
[45] Date of Patent: Jun. 4, 1996

[54] INFINITELY VARIABLE DIAMETER ROLLER

[75] Inventors: Douglas M. Kedl, Roseville; John S. Huizinga, Dellwood, both of Minn.

[73] Assignee: Minnesota Mining and Manufacturing Company, St. Paul, Minn.

[21] Appl. No.: 314,950

[22] Filed: Sep. 29, 1994

[51] Int. Cl.$^6$ ................................................ B65H 20/00
[52] U.S. Cl. ........................... 492/21; 492/16; 226/191; 226/174
[58] Field of Search ..................... 492/16, 21; 226/199, 226/191, 174, 15, 20

[56] References Cited

U.S. PATENT DOCUMENTS

| | | | |
|---|---|---|---|
| 180,169 | 7/1876 | Tasker | 492/21 |
| 792,733 | 4/1904 | Schoenherr | 492/21 |
| 2,635,330 | 4/1953 | Fentress | 492/21 |
| 3,912,193 | 10/1975 | Calvaer | 226/20 |
| 4,253,392 | 3/1981 | Brandon et al. | 492/21 |
| 4,848,119 | 7/1989 | Pav et al. | 492/2 |
| 4,958,111 | 9/1990 | Gago | 318/6 |
| 5,027,491 | 7/1991 | Sidney, Jr. et al. | 492/21 |
| 5,141,601 | 8/1992 | Karlsson et al. | 492/21 |
| 5,208,633 | 5/1993 | Genovese | 226/20 |
| 5,252,991 | 10/1993 | Storlie et al. | 226/20 |
| 5,328,072 | 7/1994 | Ruessmann et al. | 226/15 |

FOREIGN PATENT DOCUMENTS

| | | | |
|---|---|---|---|
| 215887B | 6/1961 | Austria | 492/21 |
| 662684A | 7/1938 | Germany | 492/21 |
| 242113A | 5/1969 | U.S.S.R. | 492/21 |

OTHER PUBLICATIONS

Erhardt+Leimer GmbH Specification Sheet, Web Guider With Expander Guide Roller RX 01, Leaders in Web Handling Technology.

Erhardt+Leimer GmbH, Document No. 054311 E, Operating Instructions, Segmented Guider Roller SW 70.

Erhardt+Leimer GmbH, Document No. 054312 E, Operating Instructions, Web Guiding System SWA 7120.

Erhardt+Leimer GmbH, Segmented Guider Roller SW 75/Expander Spreading Roller RXA 01.

Mount Hope Machinery Co. Document, Mount Hope Rolls.

*Primary Examiner*—S. Thomas Hughes
*Assistant Examiner*—Marc W. Butler
*Attorney, Agent, or Firm*—Gary L. Griswold; Walter N. Kirn

[57] ABSTRACT

A roller assembly for guiding webs and removing wrinkles includes an outer cylindrical surface that is supported on a shaft about which it can rotate. Portions of the outer diameter of the outer cylindrical surface can expand and contract radially using a radial expander that can move axially along the shaft. The radial expander has an increasing radius from a point closer to a central transverse axis of the roller assembly to a point further from the central transverse axis of the roller assembly so that the closer the radial expander is to the central transverse axis, the greater the radial expansion of the outer cylindrical surface.

12 Claims, 5 Drawing Sheets

INFINITELY VARIABLE DIAMETER ROLLER

TECHNICAL FIELD

The present invention relates to web rollers. More particularly, the present invention relates to web rollers that guide webs and reduce wrinkles.

BACKGROUND OF THE INVENTION

Known forms of transporting webs use straight, non-variable cylindrical rollers. These rollers, however, compromise wrinkle formation and are designed for limited tension ranges and thread path conditions. To reduce this wrinkle formation, an anti-wrinkle roller is often used as a steering roller in a web line. However, known anti-wrinkle rollers compromise guiding by increasing lateral instability of the web. These rollers are always spreading the web, requiring a separate downstream device to steer the web. Also, some of these rollers have a limited range of wrap angles over which they are effective.

There are two types of anti-wrinkle rollers, both of which spread the web in the width direction to smooth out wrinkles. The first type spreads the web before it enters the roller by inducing crossweb lateral tensions in the span immediately upstream of the roller. Curved axis rollers (also referred to as bowed or banana rollers) and reverse crown rollers are of this type. The second type spreads the web after it contacts the roller surface, through spreading action from some form of crossweb expansion of the roller surface. Roller surface expansion comes from mechanisms that induce lateral expanding of slats or flexible roller covering, or from machined grooves in the roller surface that create an outward, axial expansion when deflected by radial compression of the web as it wraps the roller surface.

Some known rollers use circumferential spiral grooves which are intended to stretch the web.

SUMMARY OF THE INVENTION

The present invention provides a roller assembly that is used for guiding webs. The roller assembly includes an outer cylindrical surface having a first portion and at least one second portion. The outer cylindrical surface is supported on a shaft about which it can rotate. The outer diameter of the first portion is independently variable with respect to the outer diameter of each of the second portions. Further, the ends of the outer cylindrical surface can be inwardly biased toward the central longitudinal axis of the outer cylindrical surface.

The outer cylindrical surface can include two second portions, where the diameter of each of the two second portions is independently variable with respect to the other second portion. In this embodiment, the first portion of the outer cylindrical surface may be located between the two second portions and the outer diameter of this first portion may be fixed. One end of each second portion is connected to the first portion and the opposite end of each second portion is radially moveable. The second portions can be constructed of strips of material.

A control device selectively changes the outer diameter of the outer cylindrical surface. The control device receives a remote position signal from a web sensor, compares the remote position signal with a desired position, and sends a repositioning signal to an actuator motor. At least one radial expander can move axially to change the outer diameter of the outer cylindrical surface. Each radial expander has a radius that increases from a point closer to the central transverse axis of the roller assembly to a point further from the central traverse axis of the roller assembly so that the closer each radial expander is to the central transverse axis, the greater the radial expansion of the cylindrical surface. The control device can receive a signal that the web has moved toward one side of the roller and send a signal to sufficiently expand the diameter of the opposite side of the roller to laterally displace the web to its desired position. The control device also can receive a signal that the web width has decreased, and send a signal to expand the diameter of both sides of the outer cylindrical surface to increase the width of the web to its desired width.

DETAILED DESCRIPTION

Figure 1:
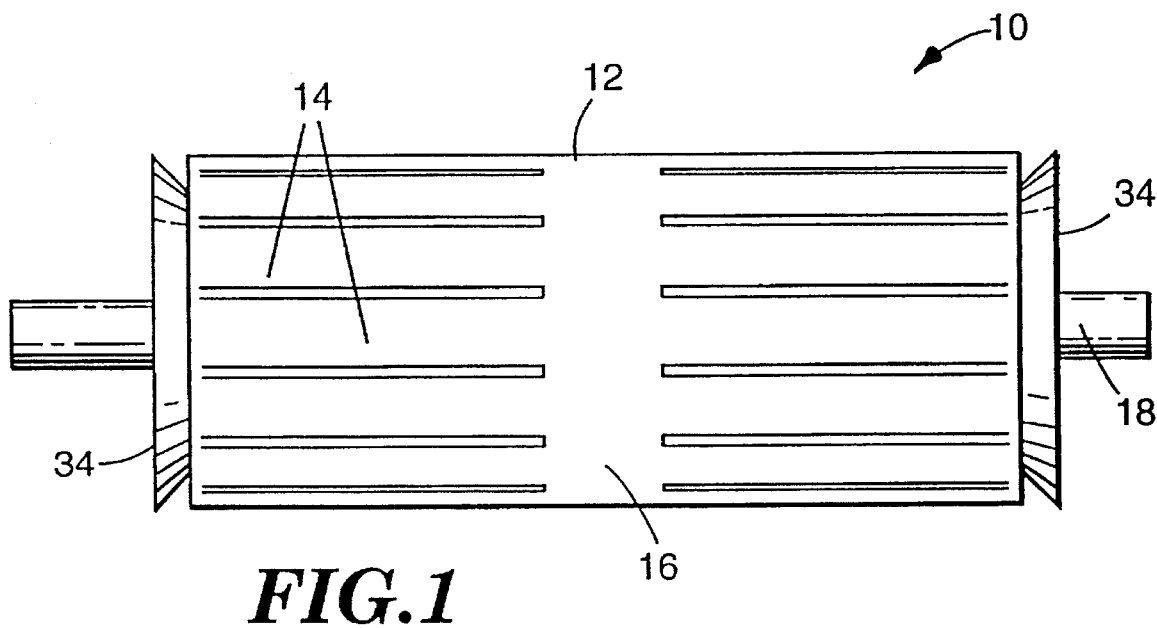
FIG. 1 is a side view of a roller assembly of the present invention having axial strips connected to both sides of a central core area.

The present invention is an electro-mechanical roller which can be installed in any location in a web line where the web might need lateral alignment or wrinkle reduction. The roller can be an idler or it can be motor driven to operate as a pull roller. The roller is a non-intrusive addition to a web line; when not needed to adjust or compensate for web defects the roller takes the shape of and operates as a standard cylindrical roller. With edge sensors and a feedback control, the roller can perform multiple functions simultaneously, such as guiding the web while preventing wrinkles. For example, the roller can combine conical shape guiding with reverse crown wrinkle removal to position the web accurately without compromising either stability or wrinkle initiation. The roller shape can vary from a cylinder to a cone, crown, or reverse crown, as required to modify the web handling characteristics.

In operation, when the diameters of the ends of the roller are larger than that of the center, the roller forms a reverse crown roller, and has a spreading effect on the web to remove wrinkles. When the diameters of the ends are smaller than that of the center, the roller forms a crown roller, and causes the web to center on the maximum crown diameter. When the diameter of one end is larger than the diameter of the other end, the roller forms a surface that approximates a tapered or conical roller, and causes the web to deflect laterally toward the large diameter side. Varying the shape and diameter of the roller is controllable and can be performed manually or automatically, in response to inputs.

This roller can also prevent wrinkles in the web line itself. For anti-wrinkling, the roller induces crossweb tensile stresses into the web by expanding the diameter of the ends of the roller to an outer diameter larger than the diameter at the center of the roller, thereby creating a reverse crown roller. A mathematical expression, derived from known elastic mechanics relationships, predicts the amount of crossweb spread, or anti-wrinkling stresses that will be induced by changing the dimensions or position of a particular roller, and rollers have been designed based on this expression. These expressions can be used to define the surface shape for rollers to spread webs for wrinkle elimination. The mathematically designed rollers can produce enough stress to spread the web without undue lateral motion or web distortion.

The roller of this invention has many features that are not found in conventional rollers. It can prevent wrinkles in the web line while providing crossweb tension leveling for web that is distorted. Unlike conventional rollers, this roller can provide web centering and lateral web guiding, but need not always spread the web. This roller can prevent and eliminate wrinkles while steering the web. There are no minimum requirements for a wrap of the web around the roller. In operation, the roller can compensate for a distorted web (where the crossweb distribution of tension is non-uniform) as well as for bad web line alignment (where the rollers are out of tram).

An additional feature of the roller of this invention is that it can actually reduce wrinkles and laterally shift portions of the web before those portions reach the roller. For example, once the front part of the wrinkle reaches the roller, the roller reacts and changes diameter to reorient the web incoming to the roller.

As shown in FIG. 1, the roller 10 is formed of a generally cylindrical sleeve 12 having a plurality of long, narrow axial strips 14. The sleeve 12 can be manufactured as a single unit or can be made of two or more pieces to facilitate access to the inside of the roller, whether divided into partial cylinders extending the length of the sleeve or partial or complete cylinders extending for only part of the sleeve length. The axial strips 14 can be individually mounted to both sides of a core portion 16 to form the sleeve 12, or they can be cut from a single cylinder as the core portion. The axial strips 14 can have a curvature that matches that of the cylindrical sleeve as a whole, or they can be formed of other shapes. For example, the axial strips 14 can be formed of individual complete rods, can be tapered, or can have cross sections constructed to control the diametric shape change of the cylindrical sleeve 12.

The roller 10 is mounted on a non-rotating shaft 18 located at the central longitudinal axis of the roller. The ends of the axial strips 14 are free to move radially only. The sleeve 12 may be covered with a smooth or textured covering to provide controlled friction between the roller and the web, as long as the axial strips 14 can expand and contract radially. In addition, the ends of the axial strips 14 may be biased toward the shaft 18 either by manufacturing the axial strips 14 so that they are biased, or by providing external biasing such as using elastic bands or straps 42 (see FIG. 2) around the circumference of the sleeve 12 near the ends of the axial strips 14.

Figure 2:
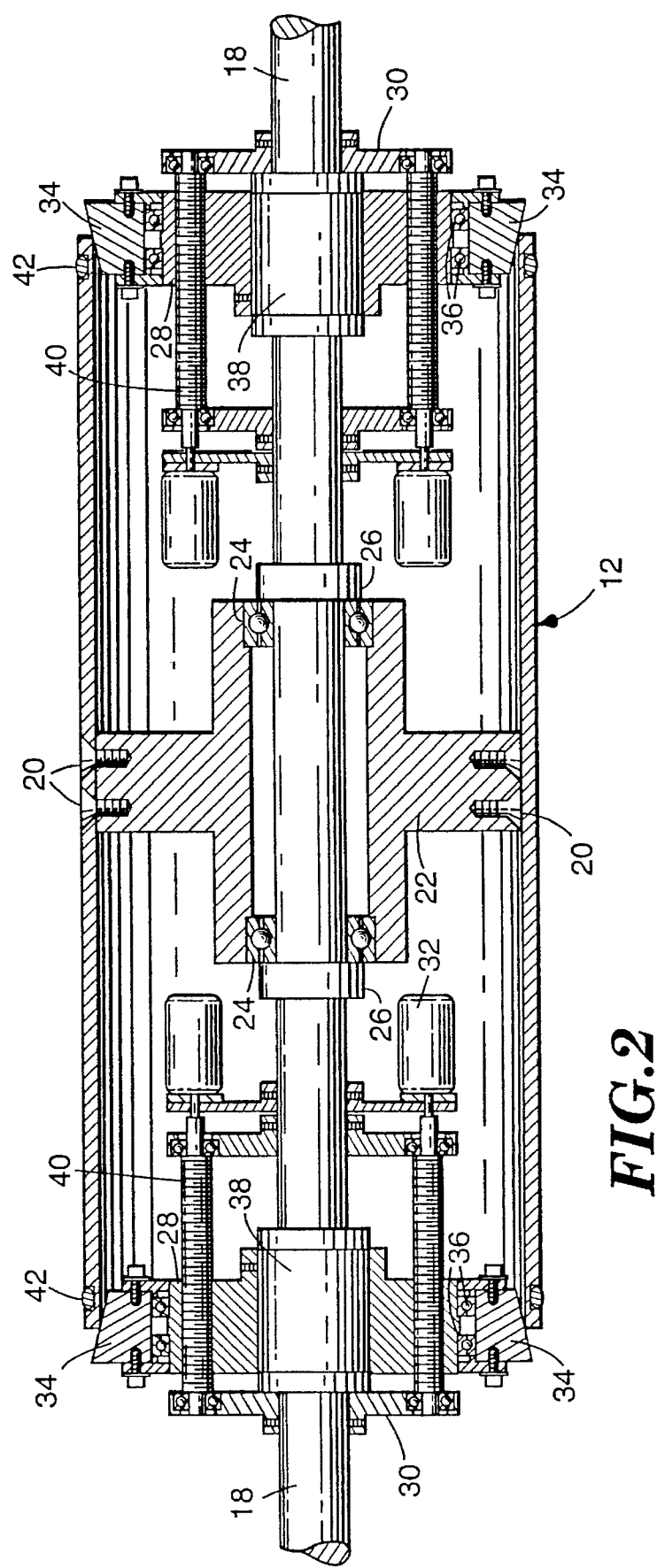
FIG. 2 is a side view of a central sleeve support assembly and a slide block and stabilizer plate assembly of the roller assembly of FIG. 1 with portions of the sleeve broken away.

Referring to FIG. 2, the sleeve 12 is mounted by screws through center holes 20 to a sleeve support 22 near the axial center of the roller 10, and the sleeve support 22 is mounted on the shaft 18. The sleeve support 22 rides on bearings 24 that connect it to the shaft 18 and a collar 26 holds the sleeve support 22 on the shaft 18. The sleeve support 22 and the sleeve 12 rotate together on the shaft 18. The shaft 18 may be constructed from individual bars, tubes, cylinders, or other known shaft materials.

A slide block assembly 28 and stabilizer end plates 30 are mounted on each end of the shaft 18, and the sleeve support 22 is mounted between them. A tapered end ring 34 or other radial expander is mounted at the outer diameter of the slide block assembly 28 by radial bearings 36. Each end ring 34 expands and contracts the sleeve 12 and is actuated by an actuator. Each actuator includes two motors 32, two slide screws 40, two stabilizer end plates 30, and the stabilizer end plates 30 which hold the slide screws 40 rigid. Other combinations of motors, slide screws, and end plates also can be used. The slide screws 40 connect the motors 32 to the slide block assembly 28. The tapered outer diameter of the end ring 34 contacts the inner surface of the sleeve 12, and the radial bearings 36 permit the end ring 34 to rotate with the sleeve 12. The slide block assembly 28 is connected to the shaft 18 by a linear bearing 38 which permits axial movement along the shaft 18 without rotation.

The free ends of the axial strips 14 rest against the tapered end rings 34 at each end of the roller 10. The end rings 34 are manually or automatically driven toward each other, away from each other, or with each other along the shaft 18 to move the strips 14 and vary the diameter of the roller along its surface. The end rings 34 can be driven by any rotary or longitudinal actuation that will permit repeatable axial end ring positioning. The end ring angle is related to the tolerance of the end ring placement. The tighter the actuator tolerance, the steeper the end ring angle can be.

Figure 3A:
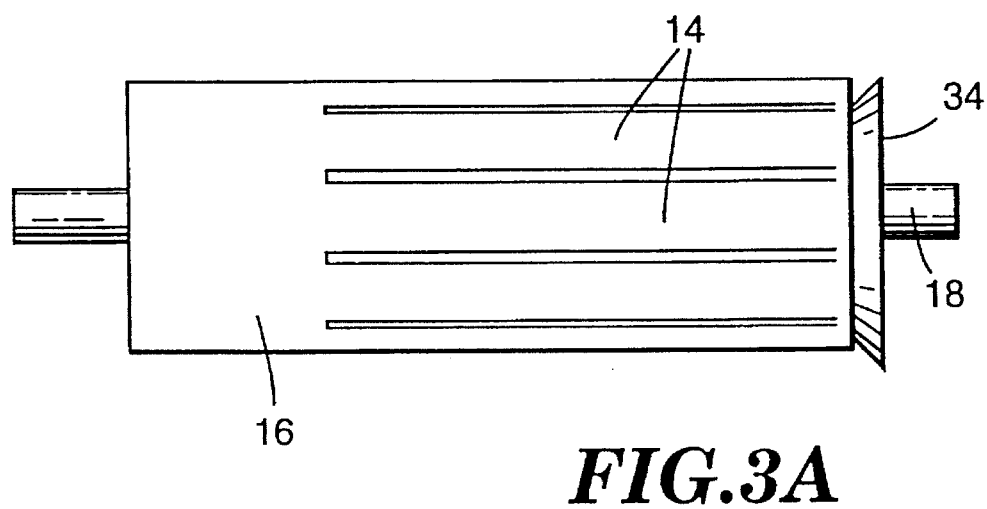
FIG. 3A is a side view of an alternative roller assembly having a axial strips connected to one side of a edge core area.

In an alternative embodiment, shown in FIG. 3A, the core portion 16' of the roller 10' is located at one end of the sleeve 12' so that the axial strips 14' are hingedly attached to one side of the core portion 16'. Thinner hinges permit the strips 14' to bend in a more cubic curve. The ends of the axial strips 14' that are not attached to the core portion 16' are free to move radially. The core portion 16' cannot expand or contract radially; however, the roller could be configured so that the diameter of the core portion 16 is variable. FIGS. 3B, 3C, 3D, and 3E better show the operation of this embodiment.

Figure 3B:
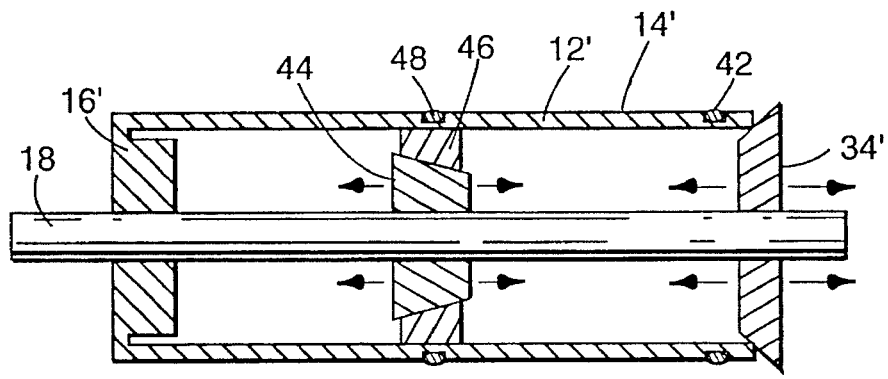
FIGS. 3B, 3C, 3D, and 3E are schematic partial views of the roller of FIG. 3A.
Figure 3C:
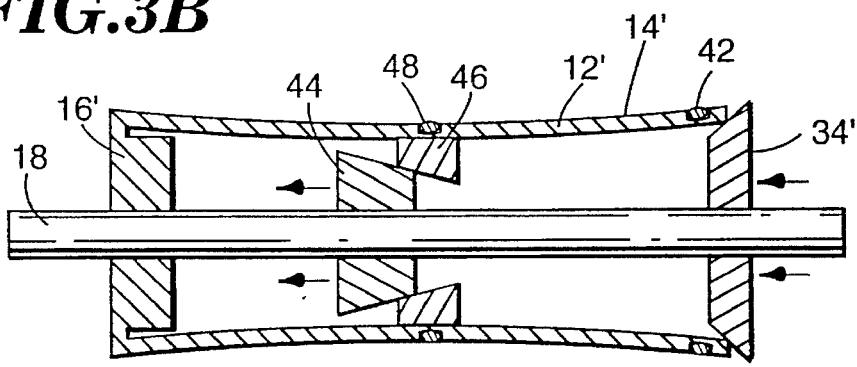
Figure 3D:
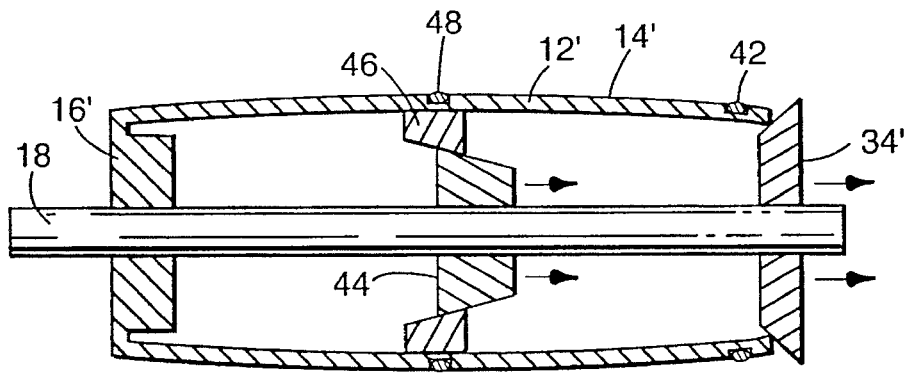
Figure 3E:
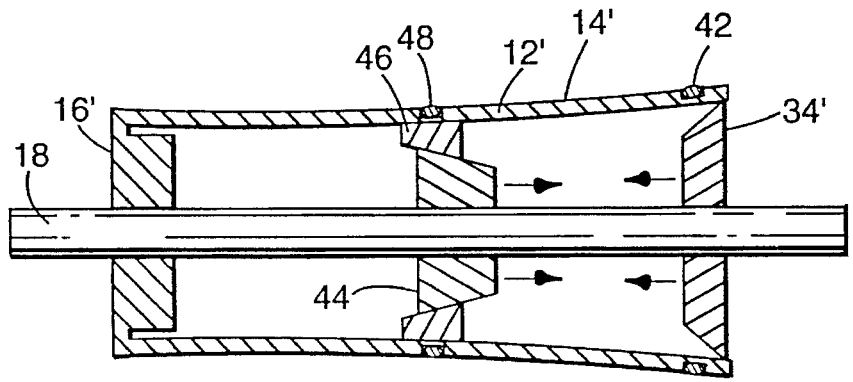

FIG. 3B shows that in addition to the end ring 34', the roller includes a center ring 44 which moves on the shaft in a similar fashion to the end ring 34'. A tapered center block 46 is attached to the sleeve. The taper of the center block 46 could be complementary to that of the center ring 44. An elastic band 48 or other biasing devise biases the central portion of the sleeve 14' toward the central longitudinal axis of the sleeve. FIG. 3C shows that when both the end ring 34' and the center ring 44 move toward the core portion, the sleeve 14' takes the shape of a reverse crown. FIG. 3D shows that when both the end ring 34' and the center ring 44 move away from the core portion, the sleeve 14' takes the shape of a crown. FIG. 3E shows that when the end ring 34' and the center ring 44 move toward each other, the sleeve 14' takes the shape of a taper. Alternatively, the roller 10' can be formed without the center ring 44 or the center block 46.

Figure 4:
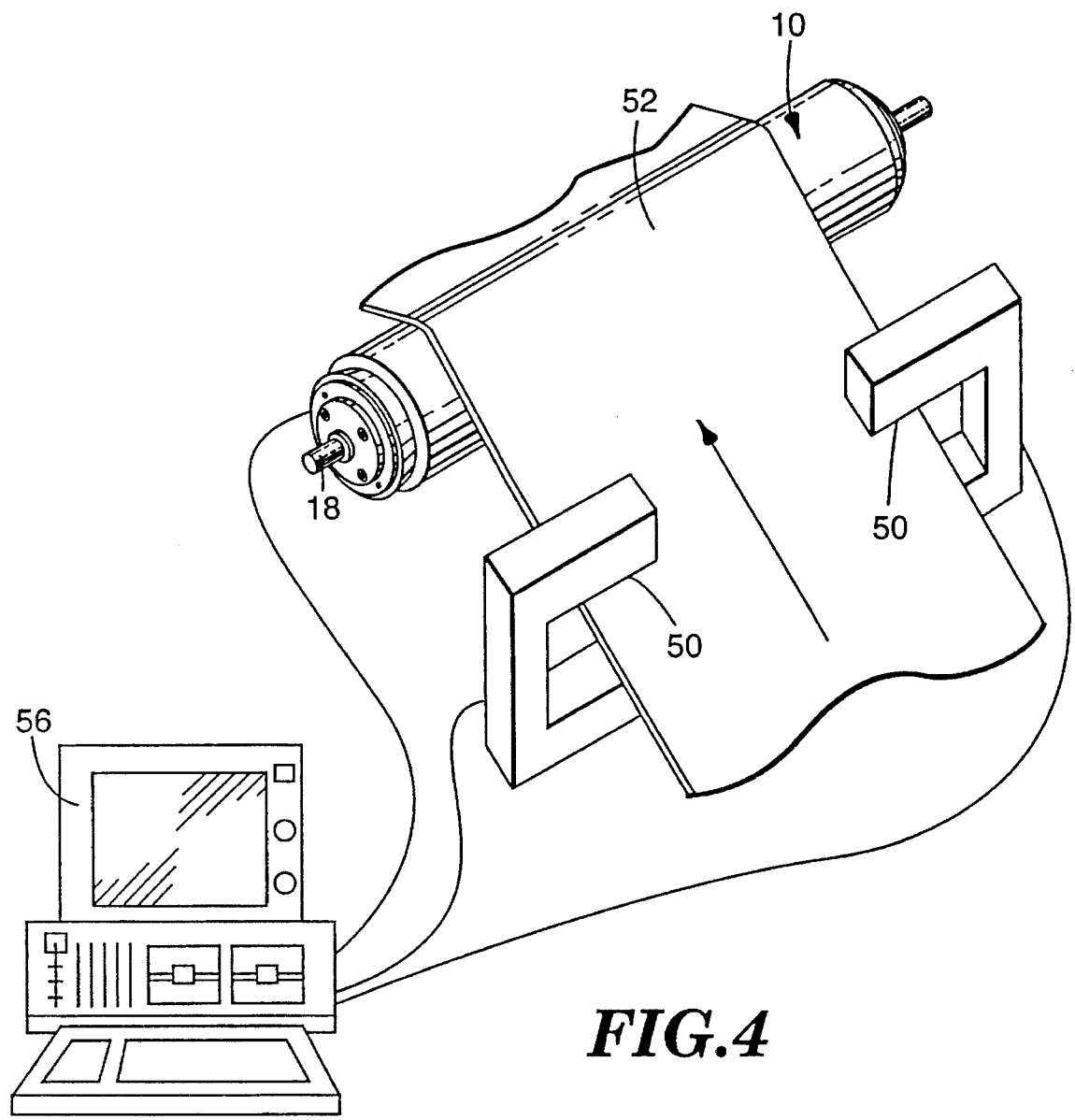
FIG. 4 is a perspective view of a web steering system of the present invention.

The roller diameter can be controlled using edge sensors 50. As shown in FIG. 4, two edge sensors 50 are located in the web line near the tangent line where the web 52 enters onto the variable diameter roller 10 at each end of the web 52. The edge sensors 50 sense and measure the absolute web width as well as lateral position relative to the web line machine direction center. If the edge sensors 50 sense a variance, an electrical signal is sent to end ring actuators located on the slide block assembly 28 to move to vary one or both roller end diameters.

The end ring actuators can be controlled separately from individual edge sensors 50 or tension sensors (not shown). Edge control is used for anti-wrinkling and guiding. Tension control is used when the roller is used for improving crossweb tension uniformity. The edge sensors 50 measure the position of the web edges in the upstream span, close to where the web enters the roller. The distance between the edge sensors 50 is set at the web width if the web were flat and running straight down the machine direction. Any variation in the signal from the edge sensors 50 can be reconciled into lateral displacement and width change.

If the edge sensor 50 on one side indicates that the web is not at the set position but the edge sensor 50 at the other side indicates that the web is at the set position, this means that the web width has changed, usually indicating the presence of wrinkles, and the end rings 34 move toward the transverse central axis to expand the ends of the sleeve 12 into a reverse crown roller to spread the web back to the desired width dimension. If the edge sensors 50 on both sides indicate that the web is not at the set position, but also indicate that the web width is proper, the entire web has shifted. This lateral displacement is corrected by changing moving one or both end rings 34 to form a cone so the web will move toward the large diameter side. If the edge sensors 50 on both sides indicate that the web is not at the set position and the web width is not proper, the web is wrinkled and has shifted and the end rings move away from the transverse central axis to decrease the diameter of the roller ends to form a crown roller. In practice, it does not matter which side of the cylindrical sleeve (including the middle) has a diameter change as long as the relative sizes create the desired web effects.

The complete system of the web edge sensors 50, feedback control, and a steering roller 10 can use a DOS-based 486 computer 56 or better running LabView (a graphical data acquisition and control environment from National Instruments) under Microsoft Windows.

Figure 5:
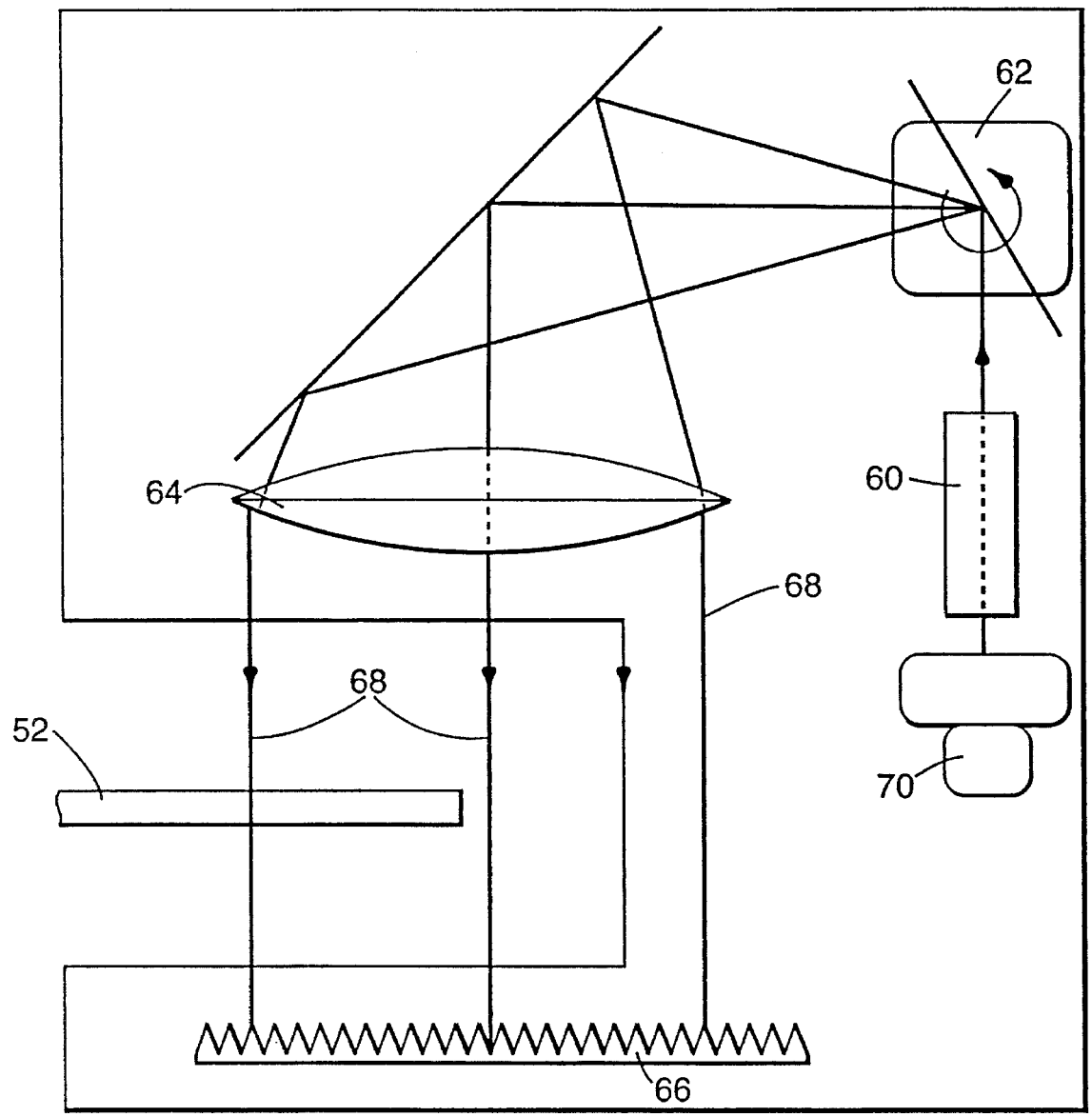
FIG. 5 is a schematic view of the operation of a web edge sensor of the present invention.

A web edge sensor is illustrated in FIG. 5. The edge sensor includes a laser 60, such as a red solid state laser, a galvanometer mirror 62, a cylindrical lens 64, and a retromirror 66 (which can be made with 3M™ Scotch™ optical lighting film). The light from the laser 60 is focused by its own collimating lens (not shown). This light is scanned by the galvanometer mirror 62 onto the cylindrical lens 64. The cylindrical lens 64 focuses the laser beam at approximately the plane of the web and gives a telecentric scan that produces the scanned beam 68, which is always perpendicular to the web. The scanned beam 68 interacts with the web edge before striking the retro-mirror 66, which is retroreflective only horizontally. The light again interacts with the web edge before being descanned by the same galvanometer mirror 62. The optical axis of the system is tilted so that the light beam strikes a silicon photo detector 70 mounted below the laser 60 (in the vertical plane the retro-mirror 66 is not retro-reflective and acts as a mirror).

The laser 60 is focused at the web and defocused at the retro-mirror 66 to avoid seeing the grooves machined into the retro-mirror 66. This gives the greatest resolution at the web edge. Alternatively, a rotating mirror could be mounted on a galvanometer when speed is not critical. The system is optically aligned by moving the laser only. All other components are mounted relative to the laser beam and any misalignment is removed by adjusting the laser. A large detector can allow less accuracy in the alignment of the system. Any retro-mirror flatness variations can be negated by using a large detector. Also, the sensor can detect edges easily for opaque or semi-transparent and can use specular lighting using the refractive index change that occurs at the web edges for transparent webs.

It is desirable to have only those forces on a web in the machine direction that are required to move it along the web line, while maintaining some structural rigidity for processing. Any anti-wrinkling, steering, or centering will induce some forces in the web in a direction perpendicular to the machine direction, commonly known as the cross-web direction. In order to spread or stretch a web in the cross-web direction, the forces must outwardly oppose each other. If the forces are not balanced, the difference will produce a net force in the cross-web direction, which will consequently induce lateral displacement. To center a web on the machine direction, these forces inwardly oppose each other, which creates compression and the possibility of wrinkles.

Lateral guiding is required when the web must conform to a specific lateral registration. With the roller of the present invention, the amount of guiding depends upon the ratio of maximum to minimum diameters that the roller can assume. In general, this roller is not intended as a replacement for pivot roller guiding that is used to re-align a web after leaving ovens or before winding. Rather, it provides adequate guiding for webs entering coating or laminating stations where accurate edge control is required, but where there is limited space for web steering/guiding devices. The operation of the roller for lateral guiding is the same as for the web centering, except that the web edge sensors may reference a line other than the web machine direction centerline. Two or more rollers may be used in edge guiding the web before laminating or sheeting.

An additional feature of the roller 10 is that is can be used to control web tension. This is useful when uniformly stressed webs are required, such as in coating or laminating. Known tension sensors can measure the crossweb tension. If the tension varies or is not at the desired level, the diameter of the roller 10 can change to make the tension uniform. The crossweb tension may be derived from multiple measurements of tension at various stations across the width of the web or at only two stations at the respective edges of the web. The crossweb tension can be measured from load cells using known systems.

When using this method for controlling the roller, crossweb tension measurements should be taken in both the upstream and downstream span to confirm and correct the measurements. The diameter of the roller 10 is adjusted to produce the crossweb tension with the least variation. A low tension on one side is increased by increasing the roller diameter to increase the web tension. A high tension on one side is decreased by decreasing the roller diameter to decrease the web tension.

The roller of the present invention provides crossweb tension leveling by changing the shape of the roller to compensate for the lateral displacement induced by the web distortions. The web can be recentered on the machine direction if the roller assumes a conical shape. The web will displace toward the large diameter side a distance determined by the size of the cone angle. This shifts and can center the web. The conical shape creates a web path where the slack or low tension side of the web is made to travel a longer distance then the tight side. In this manner, web tensions are made more uniform.

The only size limitations on the roller are for smaller or shorter rollers, where the roller motors and expansion mechanisms may be difficult to construct. However, because the principles of making the roller of this invention can be used for both small and large rollers, smaller roller motors and expansion mechanisms may be used for smaller versions of the roller of the present invention. In addition, since narrow webs are less prone to wrinkles than wider webs, the roller of the present invention will typically be used for larger rollers, where there are less concerns with component size.

We claim:

1. A roller assembly for guiding webs comprising:

an outer cylindrical surface rotatably supported on a shaft, wherein the outer cylindrical surface has a central longitudinal axis parallel to the outer cylindrical surface and comprises a first portion having an outer diameter and at least a first expanding portion having an outer diameter, wherein the first expanding portion comprises a plurality of strips arranged axially around its outer cylindrical surface;

a means for enabling the outer cylindrical surface to rotate around the shaft; and a means for selectively changing the outer diameter of the first expanding portion to enable the first expanding portion to assume an infinite number of different diameters between a smallest diameter and a largest diameter, comprising at least one radial expander disposed in the first expanding portion to move axially on the shaft, wherein the radial expander has an increasing radius from a point closer to the first portion to a point further from the first portion so that the closer the radial expander is to the first portion the greater the radial expansion of the outer diameter of the first expanding portion, wherein the outer diameter of the first expanding portion is independently variable with respect to the outer diameter of the first portion.

2. The roller assembly of claim 1 wherein the outer cylindrical surface further comprises a second expanding portion and the first portion is located between the first and second expanding portions.

3. The roller assembly of claim 2 wherein the outer diameter of the first expanding portion is independently variable with respect to the outer diameter of the second expanding portion.

4. The roller assembly of claim 1 wherein the first portion has a fixed outer diameter, a first end of the first expanding portion is connected to the first portion, and a second end of the first expanding portion is radially expandable.

5. The roller assembly of claim 1, wherein the outer cylindrical surface comprises two ends, further comprising a means for inwardly biasing the ends of the outer cylindrical surface toward the central longitudinal axis of the outer cylindrical surface.

6. The roller assembly of claim 4 wherein the means for selectively changing the outer diameter of the first expanding portion further comprises at least one web sensor, at least one actuator, means for receiving a remote position signal from the web sensor, means for comparing the remote position signal with a desired position, and means for sending a repositioning signal to the at least one actuator, and wherein the outer diameter of the first expanding portion varies in response to a movement of the at least one actuator, wherein when the remote position signal indicates that a web having a width passing over the roller assembly has moved toward a first side of the roller assembly, the radial expander moves to cause the diameter of a second side of the roller assembly to be larger than that of the first side of the roller assembly to cause lateral displacement of the web to its desired position, and wherein when the remote position signal indicates that the web width has decreased, the radial expander moves to cause the outer diameter of the first expanding portion to increase the width of the web to its desired width.

7. The roller assembly of claim 4 wherein the means for selectively changing the outer diameter of the first expanding portion further comprises a tapered center block mounted inside the outer cylindrical surface, and a tapered center ring disposed in the first expanding portion to move axially on the shaft, wherein the taper of the center ring and the taper of the center block are complementary and wherein movement of the center ring with respect to the center block changes the outer diameter of the first expanding portion between the first and second ends of the first expanding portion.

8. The roller assembly of claim 1 wherein the means for selectively changing the outer diameter of the first expanding portion is located within the outer cylindrical surface.

9. A roller assembly for guiding webs comprising:

at least one bearing assembly mounted on and concentric with a shaft;

a sleeve support assembly mounted on each bearing assembly;

an outer cylindrical surface mounted on the sleeve support assembly, wherein the outer cylindrical surface has a central longitudinal axis parallel to the outer cylindrical surface and a central transverse axis perpendicular to the central longitudinal axis and comprises a first portion having an outer diameter and a first expanding portion and a second expanding portion, each having an outer diameter, with the first portion located between the first and second expanding portions, wherein the first and second expanding portions each comprises a plurality of strips arranged axially around the outer cylindrical surface;

a radial expander that is disposed in each expanding portion to move axially, wherein the radial expander has an increasing radius from a point closer to the central transverse axis of the roller assembly to a point further from the central transverse axis so that when the radial expander is closer to the central transverse axis, the radial expansion of the cylindrical surface is greater in the expanding portion it is disposed in; and means for moving the radial expander longitudinally along the shaft.

10. The roller assembly of claim 9 wherein the outer diameter of the first expanding portion is independently variable with respect to the outer diameter of the second expanding portion, and wherein the first portion has a fixed outer diameter.

11. The roller assembly of claim 9 further comprising a means for selectively changing the outer diameter of at least one expanding portion comprising at least one web sensor, at least one actuator, means for receiving a remote position signal from the web sensor, means for comparing the remote position signal with a desired position, and means for sending a repositioning signal to the at least one actuator, and wherein the outer diameter of the at least one expanding portion varies in response to a movement of the at least one actuator.

12. The roller assembly of claim 9 wherein each of the strips comprises an inner end connected to the first portion and an outer end that is radially moveable and biased inwardly toward the central longitudinal axis.

* * * * *